UNITED STATES PATENT OFFICE.

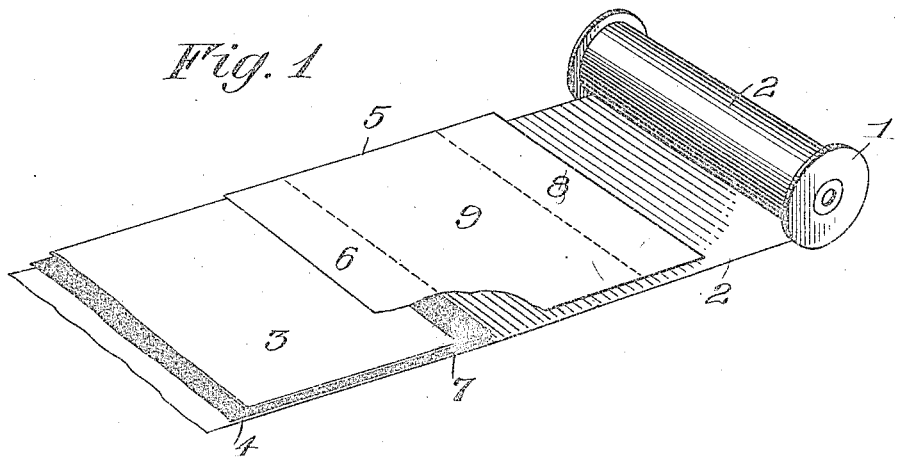
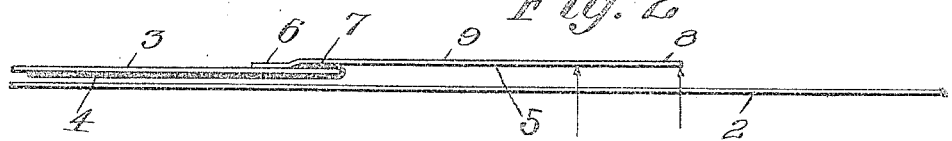
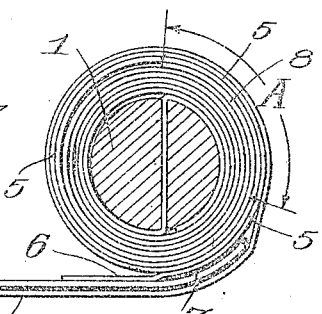

THOMAS BAKER, OF MELBOURNE, VICTORIA, AUSTRALIA, ASSIGNOR TO EASTMAN KODAK COMPANY, OF ROCHESTER, NEW YORK, A CORPORATION OF NEW YORK.

PHOTOGRAPHIC-ROLL-FILM CARTRIDGE.

1,269,365.

Specification of Letters Patent.

Patented June 11, 1918.

Application filed December 30, 1916. Serial No. 139,752.

*To all whom it may concern:*

Be it known that I, THOMAS BAKER, a subject of the King of Great Britain, residing at Melbourne, Victoria, Australia, have invented certain new and useful Improvements in Photographic-Roll-Film Cartridges; and I do hereby declare the following to be a full, clear, and exact description of the same, reference being had to the accompanying drawings, forming a part of this specification, and to the reference-numerals marked thereon.

My present invention relates to photography and more particularly to photographic film cartridges wherein a strip of sensitive film, together with a light-resisting protective backing, is wound upon a flanged spool or center and the inner end of the film strip is pasted to a gummed sticker that is later also pasted to the backing after the roll has been unrolled and exposed for the purposes of development, and the invention has for its object to provide against the moisture applied in sticking the paster to the sensitive film strip from being communicated to the gummed portion of the sticker during the rolling operation incident to initially forming the cartridge so that the sticker will remain free of the backing until properly positioned and pasted by the user. To these and other ends the invention resides in certain improvements and combinations of parts all as will be hereinafter more fully described, the novel features being pointed out in the claims at the end of the specification.

In the drawings:

Figure 1 is a perspective view of a film cartridge constructed in accordance with and illustrating one embodiment of my invention, the same being unrolled to reveal the inner or rear end of the film strip;

Fig. 2 is an edge view of the unrolled portion of Fig. 1, and

Fig. 3 is an enlarged section through the roll with the latter in a different condition from that shown in Fig. 1.

Similar reference numerals throughout the several views indicate the same parts.

A film cartridge ordinarily consists of a spool 1 for insertion in the camera upon which is wound a backing 2 of non-actinic paper or other light-resisting material. A film strip 3 is wound within the roll beneath the backing and in the present instance, I have illustrated a cartridge of the type in which a strip of carbon paper is interposed between the backing and film and wound with them for the purpose of recording by light printing designating marks on the film or negative in a manner now well known and in the drawings, 4 indicates this strip of carbon paper.

The front end of the film strip (not shown) that is, the end which is first wound upon the roll during manufacture and is first unrolled during exposure in the camera, may be and usually is permanently attached by a sticker to the backing but the rear end which is the one shown in the present drawing, is left free when the cartridge is prepared and during exposure as there is a certain amount of creeping between the film and backing during winding and unwinding that must not be interfered with. When the film is developed, however, after exposure, it is more convenient to have both ends attached to the backing and for this purpose a gummed sticker is employed which is indicated in the drawings at 5. One edge or end of the sticker is pasted along the area marked 6 to the end of the film strip 3 and over an end 7 of the carbon strip 4 folded over the margin of the strip 3, as shown, to keep it in position. This attachment of the sticker is performed during the preparation of the cartridge just before it is rolled up but another gummed area 8 at the opposite end or edge is left free for the reasons first above described and wound loosely into the roll with the other elements. Fig. 1 illustrates a step in the manufacture of the cartridge in which the backing 2 has been started on the spool 1; the film and carbon strips 3 and 4 assembled and laid thereon and the sticker 5 applied at 6, the portion 8 of the sticker being free and the whole about to be rolled up.

Inasmuch as the area 6 of the paster 5 is dampened to cause it to adhere and the strips are then immediately rolled up, moisture is communicated therefrom to an underlying convolution of the backing 2 and if this convolution contains the gummed portion 8 of the sticker in intimate association at or near the point of contact of the damp portion 6 on the opposite side, it has been found that in many cases the portion 8 of the sticker will be caused to adhere to the backing instead of remaining free as is desired. The result is that after the film has been unwound in use and its length exposed, the rear end is held in its original position instead of being free to creep and in freeing it, the sticker is apt to be so damaged as to make it unsuitable for its intended use at the proper point.

In the practice of my invention, I avoid these annoyances by making the sticker 5 fairly long and separating the pasted and unpasted gummed areas 6 and 8 by an intervening expanse 9 of paper free from adhesive. The relative proportions of these areas 6, 9 and 8 with reference to the diameter of the roll upon which they pass are so arranged that the area 8 will not be disposed in the roll beneath the area 6 and preferably not in the same sector of the roll so that there is no opportunity for the moisture to be communicated from the region 6 through the next convolution of the paper backing 2 lying beneath to the gummed portion 8 of the sticker.

In Fig. 3 I have illustrated on a large scale the relative positions of the areas 6 and 8 in the roll, the former being shown just as it is about to be convoluted during the rolling process. The sector A indicates the distribution of the gummed portion 8 of the sticker about the roll which is seen to be on the opposite side of the latter from the pasted portion 6.

The gummed area 8 would probably be sufficiently protected if lying in the same sector or directly beneath the pasted area 6 if one or more convolutions of the several strips intervened but this would involve making the paster unnecessarily long and the arrangement shown in Fig. 3 is a surer preventive.

I claim as my invention:

1. In a photographic film cartridge, the combination with a backing and a sensitive film strip wound together into a roll, of a sticker pasted to the inner end of the film strip and having a gummed portion adapted for attachment to the backing, the said gummed portion being radially offset from the pasted portion at the end of the film strip in the superposed convolutions of the roll and the inner surface of the portion of the backing lying next beneath the pasted portion being disposed against an ungummed surface.

2. In a photographic film cartridge, the combination with a backing and a sensitive film strip wound together into a roll, of a sticker pasted at one edge to the inner end of the film strip and provided at the opposite edge with an adhesive for future attachment to the backing, the intervening portion of the sticker being free of adhesive and being disposed next beneath that convolute portion of the backing which is next beneath the pasted portion of the sticker.

THOMAS BAKER.

Witnesses:
G. VAN DYNE,
O. J. WORTH.